US012691729B2

(12) United States Patent
Jeong et al.

(10) Patent No.: US 12,691,729 B2
(45) Date of Patent: Jul. 28, 2026

(54) HEAT PUMP SYSTEM FOR A VEHICLE

(71) Applicants:HYUNDAI MOTOR COMPANY,
Seoul (KR); KIA CORPORATION,
Seoul (KR)

(72) Inventors: Hoyoung Jeong, Hwaseong-si (KR);
Hochan An, Hwaseong-si (KR);
Yeonho Kim, Seoul (KR); **Gwi Taek
Kim, Cheonan-si (KR); Man Hee
Park, Suwon-si (KR); Yeong Jun Kim**,
Incheon (KR); Jae Yeon Kim,
Hwaseong-si (KR); Jeawan Kim,
Hwaseong-si (KR)

(73) Assignees: HYUNDAI MOTOR COMPANY,
Seoul (KR); KIA CORPORATION,
Seoul (KR)

( * ) Notice: Subject to any disclaimer, the term of this
patent is extended or adjusted under 35
U.S.C. 154(b) by 143 days.

(21) Appl. No.: 18/658,273

(22) Filed: May 8, 2024

(65) Prior Publication Data

US 2025/0178415 A1 Jun. 5, 2025

(30) Foreign Application Priority Data

Dec. 4, 2023 (KR) ........................ 10-2023-0173188

(51) Int. Cl.
B60H 1/32 (2006.01)
B60H 1/00 (2006.01)

(52) U.S. Cl.
CPC ..... B60H 1/32284 (2019.05); B60H 1/00278
(2013.01); B60H 1/00899 (2013.01); **B60H
1/00921 (2013.01); B60H 2001/00949**
(2013.01)

(58) Field of Classification Search
CPC ............ B60H 1/00278; B60H 1/00899; B60H
1/00921; B60H 1/143; B60H 1/32284;
B60H 2001/00914; B60H 2001/00949;
F25B 2400/051
See application file for complete search history.

(56) References Cited

U.S. PATENT DOCUMENTS 6,463,757 B1 * 10/2002 Dickson ................ F25B 43/006
62/509
2023/0373272 A1 * 11/2023 Hötzel ............... B60H 1/00485

* cited by examiner

*Primary Examiner* — Jonathan Bradford
(74) *Attorney, Agent, or Firm* — Lempia Summerfield
Katz LLC

(57) ABSTRACT

A heat pump system for a vehicle may efficiently adjust a
temperature of a battery module by using a chiller where a
refrigerant and a coolant exchange heat. Additionally, the
heat pump system for a vehicle may efficiently recollect
ambient air heat and waste heat of electrical components to
be used for heating the vehicle interior.

16 Claims, 4 Drawing Sheets

HEAT PUMP SYSTEM FOR A VEHICLE

CROSS-REFERENCE TO RELATED APPLICATION

This application claims priority to and the benefit of Korean Patent Application No. 10-2023-0173188, filed in the Korean Intellectual Property Office on Dec. 4, 2023, the entire contents of which are incorporated herein by reference.

BACKGROUND

(a) Field

The present disclosure relates to a heat pump system for a vehicle. More particularly, the present disclosure relates to a heat pump system for a vehicle capable of efficiently adjusting a temperature of a battery module, and recollecting ambient air heat and waste heat of electrical component to be used for heating a vehicle interior.

(b) Description of the Related Art

Generally, an air conditioning system for a vehicle includes an air conditioner unit circulating a refrigerant in order to heat or cool an interior of the vehicle.

The air conditioner unit, which is used to maintain the interior of the vehicle at an appropriate temperature regardless of a change in an external temperature, is configured to heat or cool the interior of the vehicle. This is achieved by heat-exchange using a condenser and an evaporator in a process in which a refrigerant discharged by a compressor is circulated back to the compressor through the condenser, a receiver drier, an expansion valve, and the evaporator.

In other words, the air conditioner unit lowers the temperature and humidity of the interior of the vehicle by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Environment-friendly technology is a core technology of the future automobile industry, and advanced car makers have focused their energy on the development of an environmentally-friendly vehicle to achieve environmental and fuel efficiency regulations.

In other words, in accordance with a continuous increase in interest in energy efficiency and environmental pollution, the development of an environmentally-friendly vehicle capable of substantially substituting for an internal combustion engine vehicle is desired. The environmentally-friendly vehicle is classified into an electric vehicle driven using a fuel cell or electricity as a power source and a hybrid vehicle driven using an engine and a battery.

An air conditioning apparatus applied to such an environment-friendly vehicle is typically referred to as a heat pump system.

The electric vehicle driven by the power source of the fuel cell generates driving force by converting chemical reaction energy between oxygen and hydrogen into electrical energy. In this process, heat energy is generated by a chemical reaction in a fuel cell. Therefore, it is desired to secure the performance of the fuel cell by effectively removing generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure the performance of the motor.

Therefore, in the hybrid vehicle or the electric vehicle according to the related art, a cooling means, a heat pump system, and a battery cooling system, respectively, should be configured as separate closed circuits so as to prevent heat generation of the motor, an electric component, and the battery including a fuel cell.

Therefore, the size and weight of a cooling module disposed at the front of the vehicle are increased, and a layout of connection pipes supplying a refrigerant and a coolant to each of the heat pump system, the cooling means, and the battery cooling system in an engine compartment becomes complicated.

In addition, since a battery cooling system for heating or cooling the battery according to a state of the vehicle is separately provided to obtain an optimal performance of the battery, a plurality of valves for selectively interconnecting connections pipes are employed. Thus, noise and vibration due to frequent opening and closing operations of the valves may be introduced into the vehicle interior, thereby deteriorating the ride comfort.

In addition, when heating the vehicle interior, the heating performance may deteriorate due to the lack of a heat source, the electricity consumption may be increased due to the usage of the electric heater, and the power consumption of the compressor may be increased.

The above information disclosed in this Background section is only to enhance understanding of the background of the disclosure. Therefore, the Background section may contain information that does not form the prior art that is already known to a person of ordinary skill in the art.

SUMMARY

The present disclosure provides a heat pump system for a vehicle capable of efficiently adjusting the temperature of the battery module by using a chiller where a refrigerant and a coolant exchange heat. The present disclosure also provides a heat pump system for a vehicle capable of efficiently recollecting the ambient air heat and the waste heat of electrical components to be used for heating the vehicle interior.

In an embodiment of the present disclosure, a heat pump system for a vehicle may include an air conditioner unit including a compressor, an internal condenser, a heat-exchanger, a first expansion valve, an evaporator, and an accumulator connected via a refrigerant line through which a refrigerant flows. The heat pump system may also include a chiller provided on a first connection line connected to the refrigerant line, and configured to adjust a temperature of a coolant by exchanging heat between the refrigerant supplied from the air conditioner unit via the refrigerant line and a coolant. Additionally, the heat pump system may include a second expansion valve provided on the first connection line at an upstream end of the chiller. The air conditioner unit may further include an internal heat-exchanger provided inside the accumulator, and configured to exchange heat between the refrigerant selectively supplied from the internal condenser or the heat-exchanger and the refrigerant selectively supplied from the evaporator or the chiller. The internal heat exchanger may also be configured to supply a liquid refrigerant among the heat-exchanged refrigerant to the first expansion valve or the second expansion valve. The air conditioner unit may further include a second connection line having a first end connected to the refrigerant line between the internal condenser and the heat-exchanger and a second end connected to the refrigerant line between the evaporator and the accumulator. The flow of the refrigerant may be controlled depending on at least one mode for a temperature adjustment of a vehicle interior or for a temperature adjustment of a battery module.

A valve for selectively opening and closing the second connection line may be provided on the second connection line.

A heat pump system for a vehicle may further include: a third expansion valve provided on the refrigerant line between the internal condenser and the heat-exchanger; and a third connection line having a first end connected to the third expansion valve and a second end connected to the refrigerant line between the heat-exchanger and the internal heat-exchanger.

The at least one mode may include: a first mode for cooling the battery module while cooling the vehicle interior; a second mode for heating the vehicle interior; and a third mode for heating and dehumidifying the vehicle interior.

In the first mode, the refrigerant line connecting the internal condenser and the heat-exchanger may be opened by an operation of the third expansion valve. The first connection line may be opened by an operation of the second expansion valve. The second connection line may be closed, and the third connection line may be closed by the operation of the third expansion valve.

Additionally, in the first mode, the first expansion valve may be configured to expand the refrigerant introduced via the refrigerant line such that the expanded refrigerant may be supplied to the evaporator. The second expansion valve may be configured to expand the refrigerant introduced into the first connection line and may flow the expanded refrigerant into the chiller to cool the battery module by using the coolant having exchanged heat with the refrigerant at the chiller. The third expansion valve may be configured to flow the refrigerant introduced from the internal condenser into the heat-exchanger without expansion.

Additionally, in the first mode, the refrigerant discharged from the heat-exchanger may be supplied to the internal heat-exchanger along the refrigerant line. The refrigerant discharged from the chiller and the refrigerant discharged from the evaporator may pass through the accumulator along the refrigerant line, and then may be supplied to the compressor. The internal heat-exchanger may exchange heat between the refrigerant supplied from the heat-exchanger and the refrigerant supplied from the evaporator and the chiller.

In the second mode, a partial refrigerant line connecting the internal condenser and a second end of the second connection line may be closed by an operation of the third expansion valve. A partial refrigerant line connecting the evaporator from a first end of the first connection line may be closed by an operation of the first expansion valve. The refrigerant line connecting from the evaporator to a second end of the first connection line may be closed. The first connection line may be opened by an operation of the second expansion valve. The second connection line may be opened, and the third connection line may be opened by the operation of the third expansion valve.

Additionally, in the second mode, the first expansion valve may stop operating. The second expansion valve may supply the refrigerant introduced via the first connection line to the chiller without expansion. The third expansion valve may expand the refrigerant such that the expanded refrigerant may be supplied to both the heat-exchanger and the chiller.

Additionally, in the second mode, a partial refrigerant among the refrigerant introduced from the internal condenser into the third connection line may be introduced into the heat-exchanger. A remaining refrigerant among the refrigerant introduced from the internal condenser into the third connection line may be introduced into the internal heat-exchanger. The refrigerant flowing from the heat-exchanger via the second connection line and the refrigerant discharged from the chiller may pass through the accumulator along the refrigerant line, and then may be supplied to the compressor.

In the third mode, a partial refrigerant line connecting from the third expansion valve to a second end of the third connection line may be closed by an operation of the third expansion valve. The refrigerant line connecting the evaporator and the internal heat-exchanger and the refrigerant line connecting the evaporator and the accumulator may be opened by an operation of the first expansion valve. The first connection line may be closed by an operation of the second expansion valve. The second connection line may be closed, and the third connection line may be opened by the operation of the third expansion valve.

Additionally, in the third mode, the first expansion valve may expand the refrigerant introduced via the refrigerant line such that the expanded refrigerant may be supplied to the evaporator. The second expansion valve may stop operating, and the third expansion valve may flow the introduced refrigerant to the third connection line without expansion.

Additionally, in the third mode, the refrigerant introduced into the third connection line from the internal condenser may be introduced into the internal heat-exchanger along the refrigerant line. The internal heat-exchanger may exchange heat between the refrigerant supplied from the internal condenser and the refrigerant supplied from the evaporator.

The second expansion valve and the third expansion valve may be electronic expansion valves configured to selectively expand the refrigerant while controlling a flow of the refrigerant.

The heat-exchanger may be configured to condense or evaporate the interiorly introduced refrigerant.

The chiller may be connected to an electrical component via a first line where the coolant circulates and connected to the battery module via a second line where the coolant circulates.

A first end of the first connection line may be connected to the refrigerant line between the internal heat-exchanger and the first expansion valve. A second end of the first connection line may be connected to the refrigerant line between the evaporator and the accumulator.

As described above, according to a heat pump system for a vehicle according to an embodiment, by efficiently adjusting the temperature of the battery module depending on a mode of the vehicle by using a chiller where the coolant and the refrigerant exchange heat, streamlining and simplification of the system may be achieved.

In addition, according to an embodiment, by efficiently adjusting the temperature of the battery module, the optimal performance of the battery module may be enabled. As a result, the overall travel distance of the vehicle may be increased due to the efficient management of the battery module.

In addition, according to the present disclosure, for heating the vehicle interior, by expanding the refrigerant and splitting the expanded refrigerant to be supplied to the heat-exchanger and the internal heat-exchanger, the flow of refrigerant may be easily controlled. Additionally, the ambient air heat and the waste heat of the electrical component may be smoothly recollected, thereby improving heating performance and efficiency.

In addition, according to an embodiment, it is possible to reduce manufacturing cost and weight through the simplification of an entire system, and thus improve space utilization.

BRIEF DESCRIPTION OF THE DRAWINGS

The above and other objects, features, and advantages of the present disclosure should be more apparent from the following detailed description taken in conjunction with the accompanying drawings below.

DETAILED DESCRIPTION

Figure 1:
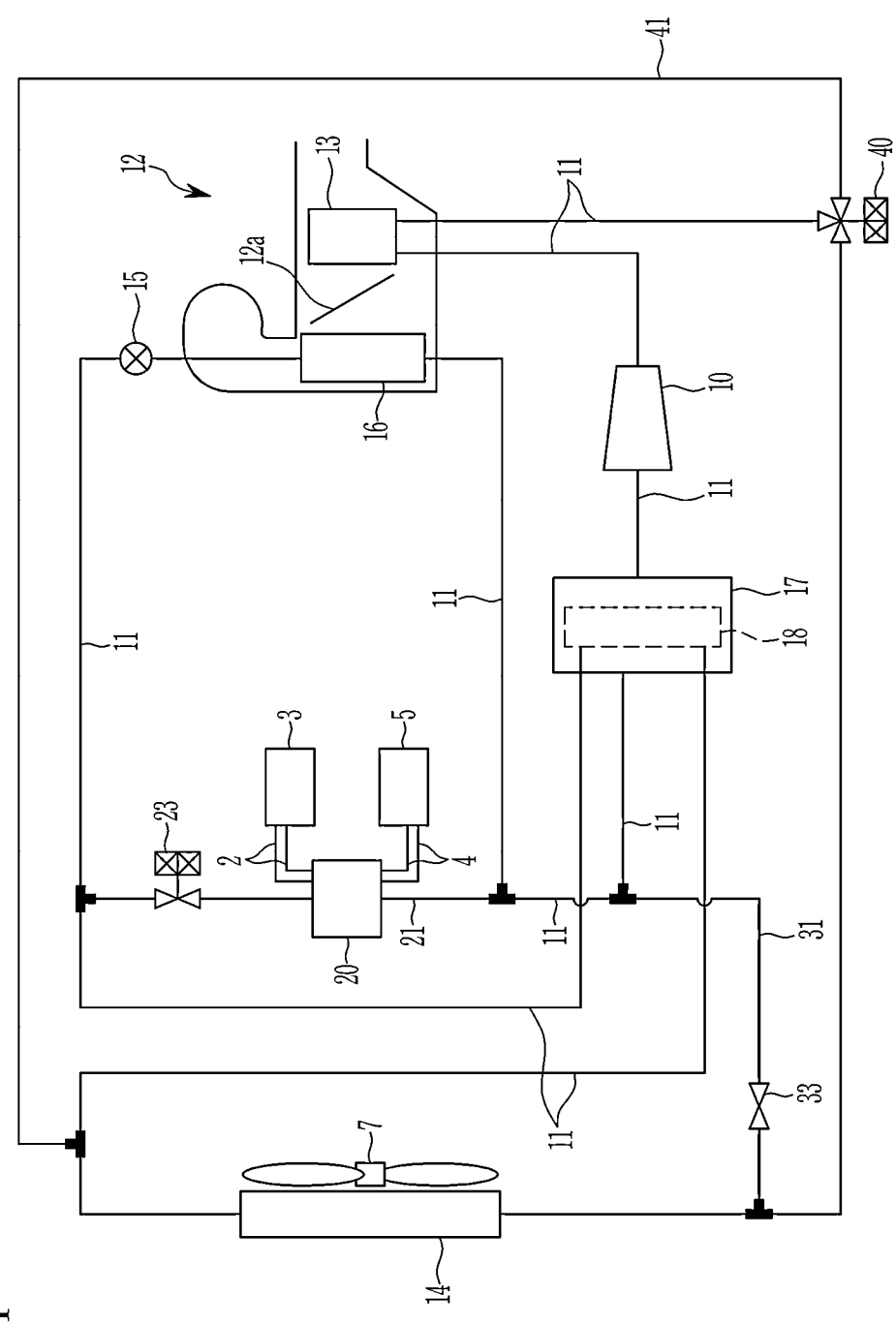
FIG. 1 is a block diagram of a heat pump system for a vehicle according to an embodiment.

Embodiments are hereinafter described in detail with reference to the accompanying drawings.

The embodiments disclosed in the present specification and the constructions depicted in the drawings are only example embodiments of the present disclosure, and do not cover the entire scope of the present disclosure. Therefore, it should be understood that there may be various equivalents and variations at the time of the application of this specification.

In order to clarify the present disclosure, parts that are not related to the description have been omitted. Also, the same elements or equivalents are referred to with the same reference numerals throughout the specification.

Also, the size and thickness of each element are arbitrarily shown in the drawings, but the present disclosure is not necessarily limited thereto. Additionally, in the drawings, the thickness of layers, films, panels, regions, and the like, may be exaggerated for clarity.

In addition, unless explicitly described to the contrary, the terms "comprise" and variations such as "comprises" or "comprising", should be understood to imply the inclusion of stated elements but not the exclusion of any other elements.

Furthermore, terms, such as " . . . unit", " . . . means", " . . . portions", " . . . part", and " . . . member" described in the specification, mean a unit of a comprehensive element that performs at least one function or operation.

When a component, device, element, or the like of the present disclosure is described as having a purpose or performing an operation, function, or the like, the component, device, or element should be considered herein as being "configured to" meet that purpose or perform that operation or function.

FIG. 1 is a block diagram of a heat pump system for a vehicle according to an embodiment.

According to a heat pump system for a vehicle according to an embodiment, a temperature of a battery module 5 may be efficiently adjusted by using a chiller 20 where a refrigerant and a coolant exchange heat, and the ambient air heat and the waste heat of an electrical component 3 may be recollected to be used for heating a vehicle interior.

For such a purpose, the heat pump system according to an embodiment may include an air conditioner unit and a chiller 20.

Referring to FIG. 1, the air conditioner unit may include a compressor 10, an internal condenser 13, a heat-exchanger 14, a first expansion valve 15, an evaporator 16, an accumulator 17, an internal heat-exchanger 18, and a second connection line 31. The second connection line 31 is connected via the refrigerant line 11 to circulate the refrigerant via the refrigerant line 11.

First, the compressor 10 may compress the introduced refrigerant and flow the compressed refrigerant to the refrigerant line 11 such that the refrigerant may flow along the refrigerant line 11.

The internal condenser 13 may be connected to the compressor 10 via the refrigerant line 11. The internal condenser 13 may exchange heat between the refrigerant supplied from the compressor 10 via the refrigerant line 11 with air.

In the present embodiment, the heat-exchanger 14 may be connected to the internal condenser 13 via the refrigerant line 11. A cooling fan 7 may be provided at a rear of the heat-exchanger 14.

The heat-exchanger 14 configured as such may condense or evaporate the introduced refrigerant through an operation of the cooling fan 7 and exchanging heat with the ambient air.

In more detail, the heat-exchanger 14 may evaporate the refrigerant when the expanded refrigerant is introduced, and may condense the refrigerant when the unexpanded refrigerant is introduced.

In other words, the internal condenser 13 and the heat-exchanger 14 may be an air-cooled heat-exchanger that exchanges heat between the interiorly introduced refrigerant and air.

The first expansion valve 15 may be connected to the heat-exchanger 14 via the refrigerant line 11. The first expansion valve 15 may expand the refrigerant introduced via the refrigerant line 11.

In the present embodiment, the evaporator 16 may be connected to the first expansion valve 15 via the refrigerant line 11. When the expanded refrigerant is introduced from the first expansion valve 15, the evaporator 16 may evaporate the refrigerant through heat-exchange with the air.

The internal condenser 13 and the evaporator 16 may be provided inside a heating, ventilation, and air-conditioning Module (HVAC) module 12.

Accordingly, the internal condenser 13 may condense the refrigerant through heat-exchange with the air introduced into the HVAC module 12. In addition, the evaporator 16 may evaporate the refrigerant through heat-exchange with the air introduced into the HVAC module 12.

An opening/closing door 12*a* configured to adjust the air having passed through the evaporator 16 to selectively flow into the internal condenser 13 depending on the cooling or heating of the vehicle interior may be further provided inside HVAC module 12.

In other words, the opening/closing door 12*a* may be opened at the time of heating the vehicle interior such that the ambient air having passed through the evaporator 16 may be introduced into the internal condenser 13.

To the contrary, at the time of cooling the vehicle interior, the opening/closing door 12*a* may be closed such that the ambient air cooled while passing through the evaporator 16 may be directly introduced into the vehicle interior. The ambient air cannot flow into the internal condenser 13 as the opening/closing door 12*a* is closed.

The accumulator 17 may be provided on the refrigerant line 11 between the evaporator 16 and the compressor 10.

The accumulator 17 may supply only the gaseous refrigerant to the compressor 10, and thereby, improve the efficiency and durability of the compressor 10.

In addition, the internal heat-exchanger 18 may be provided inside accumulator 17. The internal heat-exchanger 18 may exchange heat between the refrigerant selectively supplied from the internal condenser 13 or the heat-exchanger 14 and the refrigerant selectively supplied from the evaporator 16 or the chiller 20. The internal heat-exchanger 18 may supply a liquid refrigerant among the heat-exchanged refrigerant to the first expansion valve 15 or a second expansion valve 23.

In other words, the internal heat-exchanger 18 may exchange heat between the refrigerant condensed from the internal condenser 13 or the heat-exchanger 14 and a low-temperature refrigerant discharged from the evaporator 16. Additionally, the internal heat-exchanger 18 may supply heat-exchanged refrigerant to the compressor 10 and the evaporator 16, respectively.

In the present embodiment, the chiller 20 may be provided on a first connection line 21 connected to the refrigerant line 11.

The chiller 20 may be connected to the electrical component 3 via a first line 2 where the coolant circulates. Accordingly, the coolant selectively supplied via the first line 2 may circulate through the chiller 20.

The electrical component 3 may include a power conversion device such as an electric power control unit (EPCU), a motor, an inverter, an on-board charger (OBC), or an autonomous driving controller.

The electrical component 3 configured as such may be connected to the first line 2, and may be cooled in a water-cooled manner.

In addition, the chiller 20 may be connected to the battery module 5 via a second line 4 where the coolant circulates. Accordingly, the coolant selectively supplied via the second line 4 may circulate through the chiller 20.

In other words, the chiller 20 may adjust a temperature of the coolant through heat-exchange between the coolant selectively introduced via the first line 2 or the second line 4 and the refrigerant selectively supplied from the air conditioner unit.

The coolant having heat-exchanged with the refrigerant at the chiller 20 may circulate the electrical component 3 via the first line 2. In addition, the coolant having heat-exchanged with the refrigerant at the chiller 20 may circulate the battery module 5 via the second line 4.

A water pump (not shown) may be provided on the first line 2 and the second line 4. In other words, the coolant may circulate via the first line 2 and the second line 4 according to the operation of respective water pumps (not shown).

Accordingly, the coolant having heat-exchanged with the refrigerant at the chiller 20 may be selectively supplied to the electrical component 3 and the battery module 5, to adjust a temperature of the electrical component 3 and the battery module 5.

While repeatedly performing the above-described operation, the chiller 20 may adjust the temperature of the electrical component 3 by using the coolant having heat-exchanged with the refrigerant, and may recollect the waste heat of the electrical component 3. In addition, the chiller 20 may adjust the temperature of the battery module 5 by using the coolant having heat-exchanged with the refrigerant.

In other words, the chiller 20 may heat-exchange the refrigerant supplied from the air conditioner unit via the first connection line 21 with the coolant. As a result, the chiller 20 may adjust the temperature of the coolant. The chiller 20 may be a water-cooled heat-exchanger that exchanges heat between the interiorly introduced refrigerant and the coolant.

A first end of the first connection line 21 may be connected to the refrigerant line 11 between the internal heat-exchanger 18 and the first expansion valve 15. In addition, a second end of the first connection line 21 may be connected to the refrigerant line 11 between the evaporator 16 and the accumulator 17.

In the present embodiment, the second expansion valve 23 may be provided on the first connection line 21 at an upstream end of the chiller 20.

At the time of cooling or heating the vehicle interior, the second expansion valve 23 may selectively expand the refrigerant introduced into the first connection line 21 and flow the selectively expanded refrigerant into the chiller 20.

In addition, the second expansion valve 23 may supply the refrigerant introduced into the first connection line 21 to the chiller 20 without expansion, or may close the first connection line 21 such that the refrigerant may not be supplied to the chiller 20.

In more detail, for cooling the battery module 5 in the chiller 20 by using the coolant having heat-exchanged with the refrigerant, the second expansion valve 23 may open the first connection line 21. At the same time, the second expansion valve 23 may expand the refrigerant introduced into the first connection line 21 and flow the expanded refrigerant into the chiller 20.

In other words, the second expansion valve 23 may expand the refrigerant discharged from the internal heat-exchanger 18 to lower the temperature and flow the expanded refrigerant to the chiller 20. As a result, the configuration further decreases the temperature of the coolant passing through the interior of the chiller 20.

Accordingly, the coolant whose temperature is decreased while passing through the chiller 20 may be introduced into the battery module 5, such that more efficient cooling may be achieved.

The second expansion valve 23 may be a 2-way electronic expansion valve configured to selectively expand the refrigerant while controlling the flow of the refrigerant.

The upstream end of the chiller 20 and a downstream end of the chiller 20 may be set based on a flow direction of the refrigerant.

In other words, based on the direction in which the refrigerant flows along the first connection line 21, a location at which the refrigerant flows into the chiller 20 may be defined as the upstream end of the chiller 20. Additionally, a location where the refrigerant is discharged from the chiller 20 may be defined as the downstream end of the chiller 20.

In addition, a first end of the second connection line 31 may be connected to the refrigerant line 11 between the internal condenser 13 and the heat-exchanger 14. A second end of the second connection line 31 may be connected to the refrigerant line 11 between the evaporator 16 and the accumulator 17.

A valve 33 for selectively opening and closing the second connection line 31 may be provided on the second connection line 31.

In other words, the valve 33 may open the second connection line 31 at the time of heating the vehicle interior. To the contrary, at the time of cooling the vehicle interior or heating and dehumidifying the vehicle interior, the valve 33 may close the second connection line 31.

The air conditioner unit may further include a third expansion valve 40 and a third connection line 41.

First, the third expansion valve 40 may be provided on the refrigerant line 11 between the internal condenser 13 and the heat-exchanger 14.

In addition, a first end of the third connection line 41 may be connected to the third expansion valve 40. A second end of the third connection line 41 may be connected to the refrigerant line 11 between the heat-exchanger 14 and the internal heat-exchanger 18.

The third expansion valve 40 may selectively open and close the third connection line 41, and may selectively expand the refrigerant supplied from the internal condenser 13.

In more detail, at the time of cooling the vehicle interior, the third expansion valve 40 may close the third connection line 41. On the other hand, at the time of heating the vehicle interior, the third expansion valve 40 may open the third connection line 41, and may expand the refrigerant and flow the expanded refrigerant to the third connection line 41.

In addition, at the time of heating and dehumidification of the vehicle interior, the third expansion valve 40 may open the third connection line 41, and may flow the refrigerant supplied from the internal condenser 13 to the third connection line 41 without expansion.

The third expansion valve 40 may be a 3-way electronic expansion valve configured to selectively expand the refrigerant while controlling the flow of the refrigerant. The third expansion valve 40 may have one inlet and two outlets.

The heat pump system configured as such may control the flow of the refrigerant depending on at least one mode for a temperature adjustment of the vehicle interior or for a temperature adjustment of the battery module 5.

The at least one mode may include a first mode to a third mode.

First, in the first mode, the vehicle interior may be cooled, and the battery module 5 may be cooled.

In the second mode, the vehicle interior may be heated.

In addition, in the third mode, the vehicle interior may be heated and dehumidified.

Hereinafter, the operation and action of a heat pump system for a vehicle according to an embodiment configured as described above is described in detail with reference to FIGS. 2-4.

First, an operation in the first mode of a heat pump system for a vehicle according to an embodiment, which is for cooling the battery module 5 while cooling the vehicle interior, is described in detail with reference to FIG. 2.

Figure 2:
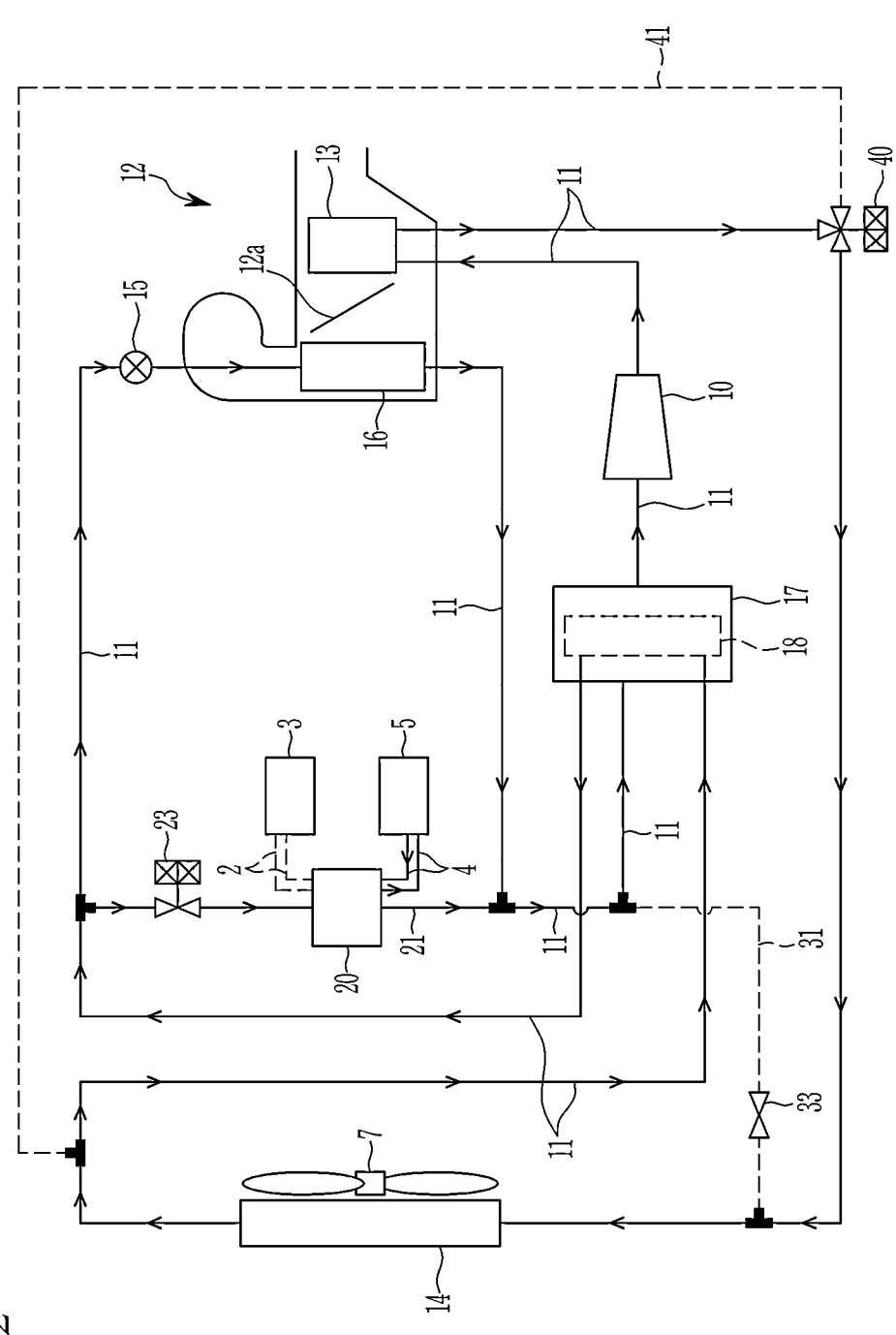
FIG. 2 is an operation diagram according to a first mode of a heat pump system for a vehicle according to an embodiment.

FIG. 2 is an operation diagram according to the first mode of a heat pump system for a vehicle according to an embodiment.

Referring to FIG. 2, the first line 2 may be closed, and the coolant may circulate via the second line 4 by an operation of a water pump (not shown).

Accordingly, the coolant passing through the battery module 5 may be supplied to the chiller 20 along the second line 4.

In the air conditioner unit, respective components may operate in order to cool the vehicle interior. Accordingly, the refrigerant may circulate along the refrigerant line 11.

The refrigerant line 11 connecting the internal condenser 13 and the heat-exchanger 14 may be opened by an operation of the third expansion valve 40.

The first connection line 21 may be opened by an operation of the second expansion valve 23 such that the refrigerant may be supplied to the chiller 20.

Accordingly, the coolant having passed through the battery module 5 may be supplied to the chiller 20 along the second line 4.

The second expansion valve 23 may expand the refrigerant introduced into the first connection line 21 and flow the expanded refrigerant into the chiller 20 to cool the battery module 5 by using the coolant having exchanged heat with the refrigerant at the chiller 20.

Accordingly, the coolant having passed through the chiller 20 may be cooled through heat-exchange with the expanded refrigerant supplied to the chiller 20.

In other words, the coolant passing through the chiller 20 may be cooled through heat-exchange with the expanded refrigerant supplied to the chiller 20. The coolant cooled at the chiller 20 is supplied to the battery module 5 along the second line 4.

Accordingly, the battery module 5 may be efficiently cooled by the coolant cooled at the chiller 20.

The second connection line 31 may be closed by an operation of the valve 33. In addition, the third connection line 41 may be closed by the operation of the third expansion valve 40.

Accordingly, the refrigerant compressed at the compressor 10 may be introduced into the internal condenser 13 along the refrigerant line 11. The refrigerant discharged from the internal condenser 13 may be introduced into the heat-exchanger 14 along the refrigerant line 11.

The third expansion valve 40 may flow the refrigerant introduced from the internal condenser 13 into the heat-exchanger 14 without expansion.

The heat-exchanger 14 may condense the introduced refrigerant through heat-exchange with the ambient air. The refrigerant condensed at the heat-exchanger 14 may be introduced into the internal heat-exchanger 18 along the refrigerant line 11.

At this time, the internal heat-exchanger 18 may additionally condense the refrigerant supplied from the heat-exchanger 14 through heat-exchange with the refrigerant supplied respectively from the evaporator 16 and the chiller 20.

A partial refrigerant among the refrigerant discharged from the internal heat-exchanger 18 may be introduced into the chiller 20 along the first connection line 21.

The refrigerant introduced into the chiller 20 may exchange heat between the coolant supplied via the second line 4, may pass through the accumulator 17 via the refrigerant line 11 connected to the first connection line 21, and then flow into the compressor 10.

In addition, a remaining refrigerant among the refrigerant discharged from the internal heat-exchanger 18 may be introduced into the first expansion valve 15 along the refrigerant line 11 to cool the vehicle interior.

The first expansion valve 15 may expand the refrigerant introduced via the refrigerant line 11 such that the expanded refrigerant may be supplied to the evaporator 16. Accordingly, the expanded refrigerant may be introduced into the evaporator 16.

The refrigerant having passed through the evaporator 16 may sequentially pass through the accumulator 17 and the compressor 10 along the refrigerant line 11.

In other words, the refrigerant discharged from the chiller 20, and the refrigerant discharged from the evaporator 16 may pass through the accumulator 17 along the refrigerant line 11, and then may be supplied to the compressor 10.

The air introduced into the HVAC module 12 may be cooled while passing through the evaporator 16 by the low-temperature refrigerant introduced into the evaporator 16.

At this time, the opening/closing door 12a may be closed such that the cooled ambient air may not pass through the internal condenser 13. Therefore, the cooled ambient air may cool the vehicle interior by being directly introduced into the vehicle interior.

The refrigerant whose condensation level is increased while sequentially passing through the heat-exchanger 14, and the internal heat-exchanger 18 is expanded and supplied to the evaporator 16, and thereby may evaporate the refrigerant to a further lower temperature.

In other words, in the present embodiment, the heat-exchanger 14 may cool the refrigerant through heat-exchange with the ambient air, and the internal heat-exchanger 18 may additionally condense the refrigerant through heat-exchange with the low-temperature refrigerant.

By such operations, the heat pump system may more efficiently condense the refrigerant, and therefore, advantageously form sub-cooling of the refrigerant.

In addition, as the refrigerant having been sub-cooled may be evaporated to a temperature lower than in the evaporator 16, the temperature of the air passing through the evaporator 16 may be further lowered, and accordingly, the cooling performance and efficiency may be improved.

While repeatedly performing the above-described processes, in a cooling mode of the vehicle interior, the refrigerant may cool the vehicle interior, and at the same time, may cool the coolant through heat-exchange while passing through the chiller 20.

The low-temperature coolant cooled at the chiller 20 may be introduced into the battery module 5 via the second line 4. Accordingly, the battery module 5 may be efficiently cooled by the supplied low-temperature coolant.

Although, in the present embodiment, it is described that the vehicle interior is cooled in the first mode, it is not limited thereto. When dehumidification is desired while cooling the vehicle interior, the opening/closing door 12a may open a side toward the internal condenser 13.

Accordingly, the air introduced into the HVAC module 12 may be cooled by the low-temperature refrigerant introduced into the evaporator 16. Thereafter, the cooled ambient air may be dehumidified while passing through the internal condenser 13 and introduced into the vehicle interior, thereby smoothly cooling and dehumidifying the vehicle interior.

An operation in the second mode of a heat pump system for a vehicle according to an embodiment, which is for heating the vehicle interior, is described in detail with reference to FIG. 3.

Figure 3:
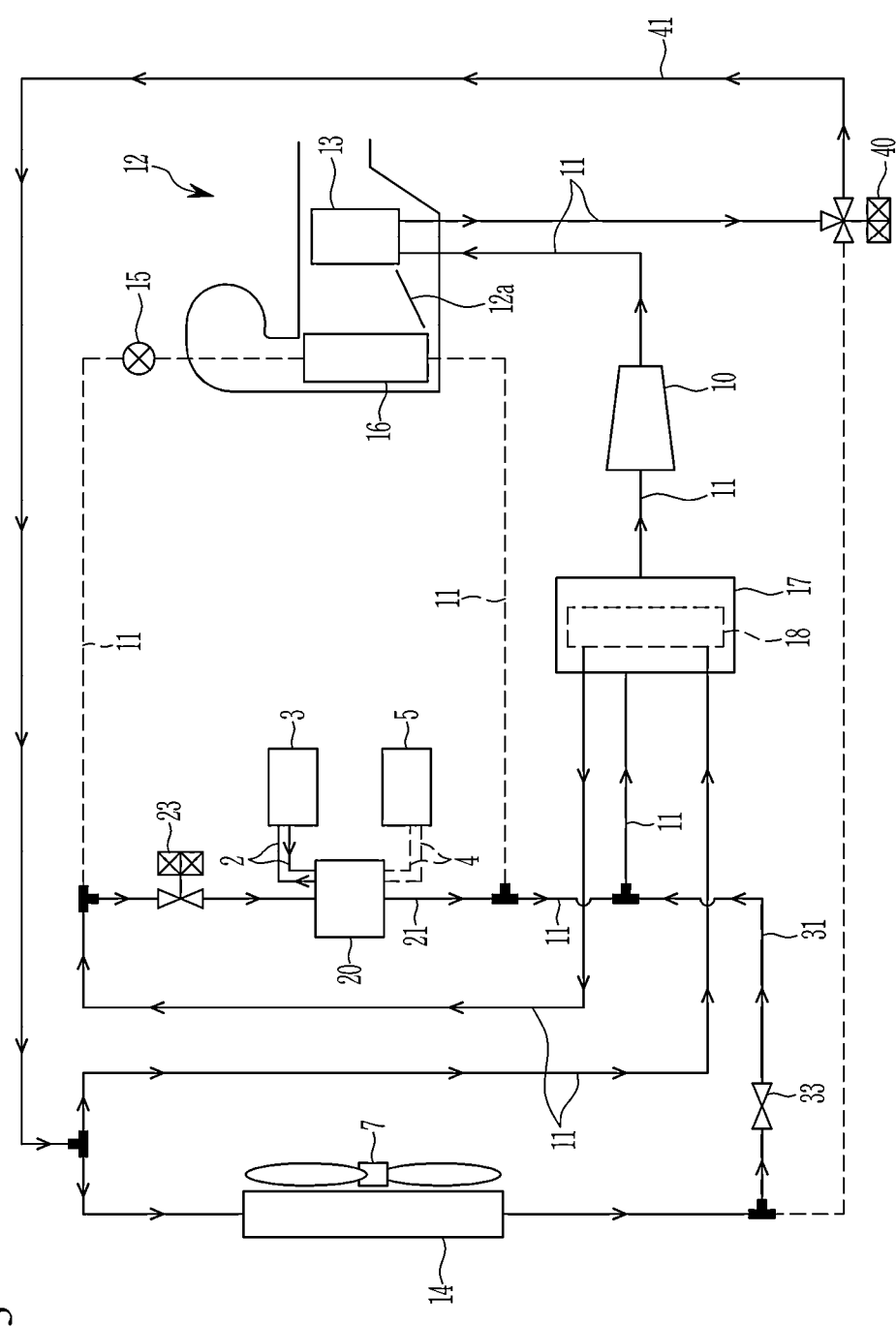
FIG. 3 is an operation diagram according to a second mode of a heat pump system for a vehicle according to an embodiment.

FIG. 3 is an operation diagram according to the second mode of a heat pump system for a vehicle according to an embodiment.

Referring to FIG. 3, the coolant may circulate via the first line 2 by an operation of a water pump (not shown). At the same time, the second line 4 may be closed.

Accordingly, the coolant having passed through the electrical component 3 may be supplied to the chiller 20 along the first line 2.

In the air conditioner unit, respective components may operate in order to heat the vehicle interior. Accordingly, the refrigerant may circulate along the refrigerant line 11.

A partial refrigerant line 11 connecting the internal condenser 13 and the second end of the second connection line 31 may be closed by the operation of the third expansion valve 40.

In addition, the partial refrigerant line 11 connecting the first end of the first connection line 21 to the evaporator 16 may be closed by an operation of the first expansion valve 15. At the same time, the refrigerant line 11 connecting the evaporator 16 to the second end of the first connection line 21 may be closed.

Accordingly, the first expansion valve 15 may stop operating.

Simultaneously, the first connection line 21 may be opened by the operation of the second expansion valve 23. The second expansion valve 23 may supply the refrigerant introduced via the first connection line 21 to the chiller 20 without expansion.

The second connection line 31 may be opened by the operation of the valve 33.

In addition, the third connection line 41 may be opened by the operation of the third expansion valve 40. The third expansion valve 40 may expand the refrigerant such that the expanded refrigerant may be supplied to both the heat-exchanger 14, the internal heat-exchanger 18, and the chiller 20.

Accordingly, a partial refrigerant among the refrigerant introduced from the internal condenser 13 into the third connection line 41 may be introduced into the heat-exchanger 14.

The heat-exchanger 14 may evaporate the expanded refrigerant through heat-exchange with the ambient air introduced from the outside. At this time, the heat-exchanger 14 may recollect the ambient air heat while evaporating the expanded refrigerant through heat-exchange with the ambient air.

A remaining refrigerant among the refrigerant introduced from the internal condenser 13 into the third connection line 41 may be introduced into the internal heat-exchanger 18.

The refrigerant having passed through the internal heat-exchanger 18 may be introduced into the chiller 20 along the opened first connection line 21.

The chiller 20 may evaporate the refrigerant having been expanded at the third expansion valve 40 and having passed through the internal heat-exchanger 18 through heat-exchange with the coolant supplied via the first line 2. The chiller 20 may recollect the waste heat of the electrical component 3 from the coolant whose temperature is increased by recollecting the waste heat from the electrical component 3.

The refrigerant flowing from the heat-exchanger 14 via the second connection line 31, and the refrigerant discharged from the chiller 20 may pass through the accumulator 17 along the refrigerant line 11, and then may be supplied to the compressor 10.

In such a state, the refrigerant supplied from the compressor 10 may be introduced into the internal condenser 13 along the refrigerant line 11. The refrigerant having passed through the internal condenser 13 may flow along the third connection line 41 connected to the refrigerant line 11.

The internal condenser 13 may exchange heat between the refrigerant and the ambient air introduced into an interior of the HVAC module 12, to condense the refrigerant.

The refrigerant condensed at the internal condenser 13 may be expanded at the third expansion valve 40. Thereafter, the refrigerant flowing along the third connection line 41 may be introduced into the heat-exchanger 14 and the chiller 20, respectively.

In other words, when the refrigerant having passed through the internal condenser 13 is supplied to the heat-exchanger 14 in the expanded state by the operation of the third expansion valve 40, the heat-exchanger 14 may evaporate the refrigerant through heat-exchange with the ambient air.

In addition, when the refrigerant having passed through the internal condenser 13 is supplied to the chiller 20 in the expanded state by the operation of the third expansion valve 40, the chiller 20 may evaporate the supplied refrigerant through heat-exchange with the coolant.

Accordingly, the heat-exchanger 14 may evaporate the supplied refrigerant through heat-exchange with the ambient air, and at the same time, the chiller 20 may cool the supplied refrigerant through heat-exchange with the coolant. By repeatedly performing such operations, the heat-exchanger 14 and the chiller 20 may recollect the ambient air heat and the waste heat of the electrical component 3.

In other words, as the heat pump system may use the recollected ambient air heat and the waste heat of the electrical component 3 to increase the temperature of the refrigerant, the power consumption of the compressor 10 may be reduced, and the heating efficiency may be improved.

The refrigerant having passed through the accumulator 17 may be supplied to the compressor 10.

In addition, the refrigerant compressed to the high-temperature and high-pressure state by the compressor 10 may be introduced back into the internal condenser 13 along the refrigerant line 11.

The opening/closing door 12a is opened such that the ambient air introduced into the HVAC module 12 and having passed through the evaporator 16 may pass through the internal condenser 13.

Accordingly, when passing through the evaporator 16 that is not supplied with the refrigerant, the ambient air introduced from the outside may be introduced at the room temperature state, which has not been cooled. The introduced ambient air may be converted to a high-temperature state while passing through the internal condenser 13 and then introduced into the vehicle interior, thereby implementing heating of the vehicle interior.

As such, a heat pump system according to an embodiment may recollect the ambient air heat at the heat-exchanger 14 while driving the vehicle, and smoothly recollect the waste heat from the coolant whose temperature is increased at the chiller 20 while passing through the electrical component 3, such that the overall heating performance and efficiency may be improved.

In addition, according to the present disclosure, the heating efficiency and performance may be improved while minimizing the usage of a separate electric heater.

Although the present embodiment has been described in that the waste heat of the electrical component 3 and the ambient air heat are recollected together, it is not limited thereto. At least one of the ambient air heat, the waste heat of the electrical component 3, and the waste heat of the battery module 5 may be selectively recollected.

In addition, an operation in the third mode of an embodiment, which is for heating and dehumidifying the vehicle interior, is described in detail with reference to FIG. 4.

Figure 4:
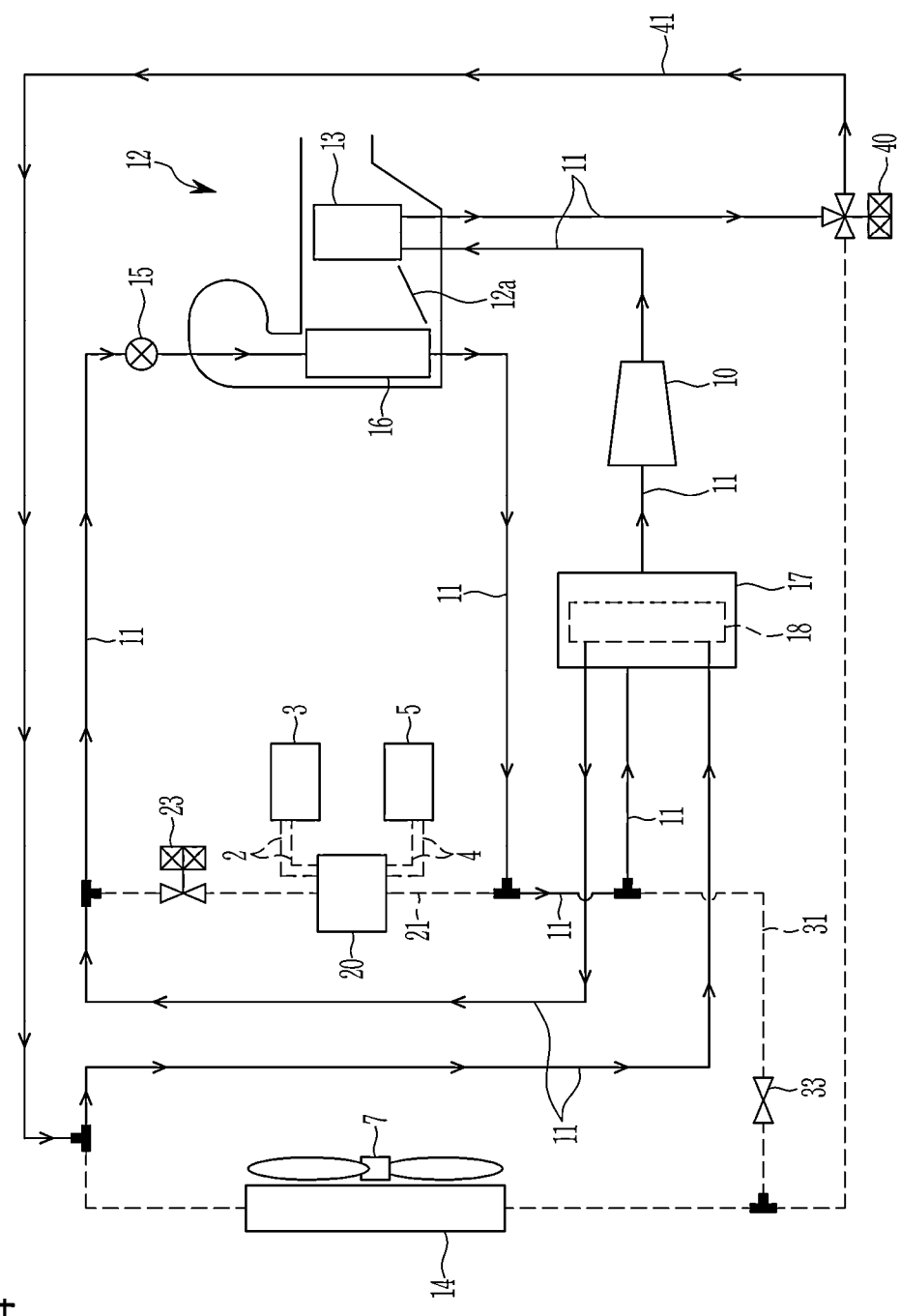
FIG. 4 is an operation diagram according to a third mode of a heat pump system for a vehicle according to an embodiment.

FIG. 4 is an operation diagram with respect to the third mode in a heat pump system for a vehicle according to an embodiment.

Referring to FIG. 4, the first line 2 and the second line 4 may be closed. Accordingly, the coolant may not be supplied to the chiller 20.

In the air conditioner unit, respective components may operate in order to heat and dehumidify the vehicle interior. Accordingly, the refrigerant may circulate along the refrigerant line 11.

The partial refrigerant line 11 connecting from the third expansion valve 40 to the second end of the third connection line 41 may be closed by the operation of the third expansion valve 40.

In addition, the refrigerant line 11 connecting the evaporator 16 and the internal heat-exchanger 18 and the refrigerant line 11 connecting the evaporator 16 and the accumulator 17 may be opened by the operation of the first expansion valve 15.

The first expansion valve 15 may expand the refrigerant introduced via the refrigerant line 11 such that the expanded refrigerant may be supplied to the evaporator 16.

Simultaneously, the first connection line 21 may be closed by the operation of the second expansion valve 23.

In addition, the second connection line 31 may be closed by the operation of the valve 33. In addition, the third connection line 41 may be opened by the operation of the third expansion valve 40.

The third expansion valve 40 may flow the introduced refrigerant to the third connection line 41 without expansion.

Accordingly, the internal condenser 13 may condense the introduced refrigerant by using the ambient air introduced into the HVAC module 12.

The refrigerant condensed at the internal condenser 13 may be introduced into the third expansion valve 40 from the internal condenser 13. Thereafter, the refrigerant may flow from the third expansion valve 40 along the third connection line 41.

The refrigerant introduced into the third connection line 41 may be introduced into the internal heat-exchanger 18.

At this time, the internal heat-exchanger 18 may additionally condense the refrigerant supplied from the internal condenser 13 through heat-exchange with the refrigerant supplied from the evaporator 16.

The refrigerant discharged from the internal heat-exchanger 18 may be introduced into the first expansion valve 15 along the refrigerant line 11.

The first expansion valve 15 may expand the refrigerant introduced via the refrigerant line 11 such that the expanded refrigerant may be supplied to the evaporator 16. Accordingly, the expanded refrigerant may be introduced into the evaporator 16.

The refrigerant having passed through the evaporator 16 may sequentially pass through the accumulator 17 and the compressor 10 along the refrigerant line 11.

In other words, the refrigerant discharged from the evaporator 16 may pass through the accumulator 17 along the refrigerant line 11, and then may be supplied to the compressor 10.

In addition, the refrigerant compressed to the high-temperature and high-pressure state by the compressor 10 may be introduced back into the internal condenser 13 along the refrigerant line 11.

The opening/closing door 12a is opened such that the ambient air introduced into the HVAC module 12 and having passed through the evaporator 16 may pass through the internal condenser 13.

In other words, the ambient air introduced into the HVAC module 12 may be dehumidified while passing through the evaporator 16 by the low-temperature refrigerant introduced into the evaporator 16. Thereafter, by being converted to a high-temperature state while passing through the internal condenser 13 and then introduced into the vehicle interior, it may smoothly heat and dehumidify the vehicle interior.

Although it is described that the first connection line 21 is closed in the present embodiment, it is not limited thereto.

In other words, in the third mode, when recollecting the waste heat of the electrical component 3 or the battery module 5 through the chiller 20 or when the temperature adjustment of the battery module 5 is desired, the first connection line 21 may be opened by the operation of the second expansion valve 23 such that the refrigerant may be introduced into the chiller 20.

In this case, at least one of the first line 2 or the second line 4 may circulate coolant by an operation of a water pump (not shown). Accordingly, the coolant having passed through the electrical component 3 or the battery module 5 may be supplied to the chiller 20 along the first line 2, or the second line 4.

Accordingly, the chiller 20 may exchange heat between the selectively introduced coolant and the refrigerant introduced into the first connection line 21 to recollect the waste heat of the electrical component 3 and the battery module 5, or adjust the temperature of the battery module 5.

Therefore, as described above, when a heat pump system for a vehicle according to an embodiment is applied, the temperature of the battery module 5 may be efficiently adjusted by using the chiller 20 where the coolant and the refrigerant exchange heat depending on a selected mode of the vehicle. As a result, the system may be streamlined and simplified.

In addition, according to an embodiment, by efficiently adjusting the temperature of the battery module 5, the optimal performance of the battery module 5 may be enabled, and the overall travel distance of the vehicle may be increased due to the efficient management of the battery module 5.

In addition, according to the present disclosure, at the time of heating the vehicle interior, by expanding the refrigerant and splitting the expanded refrigerant to be supplied to the heat-exchanger 14 and the internal heat-exchanger 18, the flow control of the refrigerant may become easy. Additionally, the ambient air heat and the waste heat of the electrical component 3 may be smoothly recollected, thereby improving heating performance and efficiency.

In addition, according to an embodiment, it is possible to reduce manufacturing cost and weight through the simplification of an entire system, and thus improve space utilization.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

2, 4: first and second lines
3: electrical component
5: battery module
10: compressor
11: refrigerant line
12: HVAC module
13: internal condenser
14: heat-exchanger
15: first expansion valve

16

16: evaporator
17: accumulator
18: internal heat-exchanger
20: chiller
21: first connection line
23: second expansion valve
31: second connection line
33: valve
40: third expansion valve
41: third connection line

What is claimed is:

1. A heat pump system for a vehicle, comprising:
an air conditioner unit including a compressor, an internal condenser, a heat-exchanger, a first expansion valve, an evaporator, and an accumulator connected via a refrigerant line through which a refrigerant flows;
a chiller provided on a first connection line connected to the refrigerant line, and configured to adjust a temperature of a coolant by exchanging heat between the refrigerant supplied from the air conditioner unit via the refrigerant line and a coolant;
a second expansion valve provided on the first connection line at an upstream end of the chiller; and
a third expansion valve provided on the refrigerant line between the internal condenser and the heat-exchanger,
wherein the air conditioner unit further includes:
an internal heat-exchanger provided inside the accumulator and configured to exchange heat between the refrigerant selectively supplied from the internal condenser or the heat-exchanger and the refrigerant selectively supplied from the evaporator or the chiller, wherein the internal heat-exchanger is configured to supply a liquid refrigerant among the heat-exchanged refrigerant to the first expansion valve or the second expansion valve;
a second connection line including: a first end connected to the refrigerant line between the internal condenser and the heat-exchanger, and a second end connected to the refrigerant line between the evaporator and the accumulator; and
a third connection line including: a first end connected to the third expansion valve, and a second end connected to the refrigerant line between the heat-exchanger and the internal heat-exchanger, and
wherein a flow of the refrigerant is controlled based on at least one mode for a temperature adjustment of a vehicle interior or for a temperature adjustment of a battery module.

2. The heat pump system of claim 1, wherein a valve configured to selectively open or close the second connection line is provided on the second connection line.

3. The heat pump system of claim 1, wherein the at least one mode comprises:
a first mode for cooling the battery module while cooling the vehicle interior;
a second mode for heating the vehicle interior; and
a third mode for heating and dehumidifying the vehicle interior.

4. The heat pump system of claim 3, wherein, in the first mode:
the refrigerant line connecting the internal condenser and the heat-exchanger is opened by an operation of the third expansion valve;
the first connection line is opened by an operation of the second expansion valve;
the second connection line is closed; and the third connection line is closed by the operation of the third expansion valve.

5. The heat pump system of claim 4, wherein:

the first expansion valve is configured to expand the refrigerant introduced via the refrigerant line such that the expanded refrigerant is supplied to the evaporator;

the second expansion valve is configured to expand the refrigerant introduced into the first connection line and flow the expanded refrigerant into the chiller to cool the battery module by using the coolant having exchanged heat with the refrigerant at the chiller; and the third expansion valve is configured to flow the refrigerant introduced from the internal condenser into the heat-exchanger without expansion.

6. The heat pump system of claim 4, wherein:

the refrigerant discharged from the heat-exchanger is supplied to the internal heat-exchanger along the refrigerant line;

the refrigerant discharged from the chiller and the refrigerant discharged from the evaporator pass through the accumulator along the refrigerant line, and then are supplied to the compressor; and the internal heat-exchanger exchanges heat between the refrigerant supplied from the heat-exchanger and the refrigerant supplied from the evaporator and the chiller.

7. The heat pump system of claim 3, wherein, in the second mode:

a partial refrigerant line connecting the internal condenser and a second end of the second connection line is closed by an operation of the third expansion valve;

a partial refrigerant line connecting the evaporator and a first end of the first connection line is closed by an operation of the first expansion valve;

the refrigerant line connecting from the evaporator to a second end of the first connection line is closed;

the first connection line is opened by an operation of the second expansion valve;

the second connection line is opened; and the third connection line is opened by the operation of the third expansion valve.

8. The heat pump system of claim 7, wherein:

the first expansion valve stops operating;

the second expansion valve supplies the refrigerant introduced via the first connection line to the chiller without expansion; and the third expansion valve expands the refrigerant such that the expanded refrigerant is supplied to the heat-exchanger and the chiller.

9. The heat pump system of claim 7, wherein:

a partial refrigerant among the refrigerant introduced from the internal condenser into the third connection line is introduced into the heat-exchanger;

a remaining refrigerant among the refrigerant introduced from the internal condenser into the third connection line is introduced into the internal heat-exchanger; and the refrigerant flowing from the heat-exchanger via the second connection line and the refrigerant discharged from the chiller pass through the accumulator along the refrigerant line, and then are supplied to the compressor.

10. The heat pump system of claim 3, wherein, in the third mode:

a partial refrigerant line connecting the third expansion valve to a second end of the third connection line is closed by an operation of the third expansion valve;

the refrigerant line connecting the evaporator and the internal heat-exchanger and the refrigerant line connecting the evaporator and the accumulator are opened by an operation of the first expansion valve;

the first connection line is closed by an operation of the second expansion valve;

the second connection line is closed; and the third connection line is opened by the operation of the third expansion valve.

11. The heat pump system of claim 10, wherein:

the first expansion valve expands the refrigerant introduced via the refrigerant line such that the expanded refrigerant is supplied to the evaporator;

the second expansion valve stops operating; and the third expansion valve is configured to flow the introduced refrigerant to the third connection line without expansion.

12. The heat pump system of claim 10, wherein:

the refrigerant introduced into the third connection line from the internal condenser is introduced into the internal heat-exchanger along the refrigerant line; and the internal heat-exchanger exchanges heat between the refrigerant supplied from the internal condenser and the refrigerant supplied from the evaporator.

13. The heat pump system of claim 1, wherein:

the second expansion valve and the third expansion valve are electronic expansion valves configured to selectively expand the refrigerant while controlling a flow of the refrigerant.

14. The heat pump system of claim 1, wherein the heat-exchanger is configured to condense or evaporate the refrigerant.

15. The heat pump system of claim 1, wherein the chiller is connected to an electrical component via a first line where the coolant circulates and connected to the battery module via a second line where the coolant circulates.

16. The heat pump system of claim 1, wherein:

a first end of the first connection line is connected to the refrigerant line between the internal heat-exchanger and the first expansion valve; and a second end of the first connection line is connected to the refrigerant line between the evaporator and the accumulator.

* * * * *